US008180968B2

(12) United States Patent
O'Krafka et al.

(10) Patent No.: US 8,180,968 B2
(45) Date of Patent: May 15, 2012

(54) REDUCTION OF CACHE FLUSH TIME USING A DIRTY LINE LIMITER

(75) Inventors: Brian W. O'Krafka, Austin, TX (US); Roy S. Moore, Austin, TX (US); Pranay Koka, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 827 days.

(21) Appl. No.: 11/729,527

(22) Filed: Mar. 28, 2007

(65) Prior Publication Data

US 2008/0244185 A1    Oct. 2, 2008

(51) Int. Cl.
*G06F 12/00* (2006.01)

(52) U.S. Cl. ........ 711/135; 711/113; 711/118; 711/133; 711/134; 711/143; 711/144; 711/145; 711/154; 711/159

(58) Field of Classification Search .................. 711/113, 711/118, 133–135, 143–145, 154, 159
See application file for complete search history.

(56) References Cited

U.S. PATENT DOCUMENTS

| 4,939,641 | A  | * | 7/1990  | Schwartz et al. | 711/146 |
|-----------|----|---|---------|-----------------|---------|
| 5,155,824 | A  | * | 10/1992 | Edenfield et al.| 711/143 |
| 5,555,399 | A  | * | 9/1996  | Waldron et al.  | 711/159 |
| 5,802,572 | A  | * | 9/1998  | Patel et al.    | 711/143 |
| 5,845,326 | A  | * | 12/1998 | Hirayama et al. | 711/135 |
| 5,895,488 | A  | * | 4/1999  | Loechel         | 711/135 |
| 6,205,521 | B1 | * | 3/2001  | Schumann        | 711/144 |
| 6,412,045 | B1 | * | 6/2002  | DeKoning et al. | 711/135 |
| 6,810,465 | B2 | * | 10/2004 | Gaither et al.  | 711/133 |
| 6,813,691 | B2 | * | 11/2004 | Gaither et al.  | 711/133 |
| 7,039,661 | B1 | * | 5/2006  | Ranade          | 707/610 |
| 2006/0143397 | A1 | * | 6/2006 | O'Bleness et al.| 711/135 |
| 2007/0079072 | A1 | * | 4/2007 | Collier et al.  | 711/133 |

* cited by examiner

*Primary Examiner* — Arpan P. Savla
(74) *Attorney, Agent, or Firm* — Osha • Liang LLP (57) ABSTRACT

The invention relates to a method for reducing cache flush time of a cache in a computer system. The method includes populating at least one of a plurality of directory entries of a dirty line directory based on modification of the cache to form at least one populated directory entry, and de-populating a pre-determined number of the plurality of directory entries according to a dirty line limiter protocol causing a write-back from the cache to a main memory, where the dirty line limiter protocol is based on a number of the at least one populated directory entry exceeding a pre-defined limit.

15 Claims, 6 Drawing Sheets

REDUCTION OF CACHE FLUSH TIME USING A DIRTY LINE LIMITER

STATEMENT REGARDING FEDERALLY SPONSORED RESEARCH OR DEVELOPMENT

This invention was made with United States Government support under Contract No. NBCH020055 awarded by the Defense Advanced Research Projects Administration. The United States Government has certain rights in the invention.

BACKGROUND

Computer systems that depend on compiler-directed coherence require that all remote data be flushed from the caches at the beginning and end of parallel loops. This is done to make sure that all modifications during the loop are made visible to all other processors. With large L3 caches (32 MB or greater) becoming common, brute-force cache flushing at the beginning and end of loops can take a substantial amount of time, thus causing a large performance degradation in the application. For example, a 128 MB L3 that is 30% dirty takes at least 0.8 milliseconds to flush using a 50 GB/sec interconnect to main memory.

This problem also arises in another context. In multi-tier clustered systems it is sometimes desirable to maintain replicas of memory across multiple nodes in the cluster. Periodically, the replicas must be put in a consistent state by flushing all cached data out to the checkpoint copies. Schemes that accelerate checkpoint function in hardware must ensure that all modified data in the hardware caches are propagated to all copies of memory. The amount of time that is required to perform the cache flushing is dependent on cache write-back policies. These policies can be broken into two basic types. One type is a write-through cache, which ensures that a cache never contains any dirty data. Although this ensures that no cache flushing is ever needed, it introduces a substantial amount of write-through traffic that exceeds the traffic capacity of any cost effective interconnect at present time. Alternatively, a write-back cache allows one or more cache entries (e.g., one or more cache lines) to remain dirty in cache until they are evicted. While write-through traffic is eliminated, streaming data may cause bursty write-backs (e.g., large amounts of cache lines are flushed in a short duration) causing bottlenecks on the interconnect. A variant of a write-back cache is called eager "write-back." Eager "write-back" flushes some of the dirty cache lines when it determines there are idle bus cycles instead of waiting for the dirty line to be evicted. This lowers the possibility of bursty write-backs causing a traffic bottleneck on the interconnect. It does not address the performance issue of needing to flush large amounts of cache lines at the beginning and end of parallel loops or upon executing a hardware checkpoint function. Accordingly, there is a need for a method and system to reduce the cache flushing time and improve the performance.

SUMMARY

In general, in one aspect, the invention relates to a method for reducing cache flush time of a cache in a computer system. The method comprises populating at least one of a plurality of directory entries of a dirty line directory based on modification of the cache to form at least one populated directory entry, and de-populating a pre-determined number of the plurality of directory entries according to a dirty line limiter protocol causing a write-back from the cache to a main memory, wherein the dirty line limiter protocol is based on a number of the at least one populated directory entry exceeding a pre-defined limit.

In general, in one aspect, the invention relates to a system comprising a main memory associated with a cache, and a dirty line directory comprising a plurality of directory entries, wherein at least one of the plurality of directory entries is populated based on modification of the cache to form at least one populated directory entry, wherein a pre-determined number of the plurality of directory entries is de-populated according to a dirty line limiter protocol causing a write-back from the cache to the main memory, and wherein the dirty line limiter protocol is based on a number of the at least one populated directory entry exceeding a pre-defined limit.

In general, in one aspect, the invention relates to a multi-tier clustered system with a plurality of nodes each comprising a cache, a dirty line limiter implemented in hardware and comprising a dirty entry count representing a number of dirty entries in the cache, and a memory, wherein write-back of a plurality of cache entries from the cache is propagated to the memory of each of the plurality of nodes according to the dirty entry count exceeding a pre-determined limit.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for a directory (hereafter referred to as dirty line directory) implemented in hardware configured to implement a dirty line limiter protocol for a cache memory in accordance with one embodiment of the invention. In general, embodiments of the invention provide a dirty line directory that may be used in a multiprocessor machine having tens of thousands of processors. Further, embodiments of the invention provide a dirty line directory that decreases the cache flush time by more frequent write-back without substantially increasing the write-back traffic according to the dirty line limiter protocol.

Figure 1:
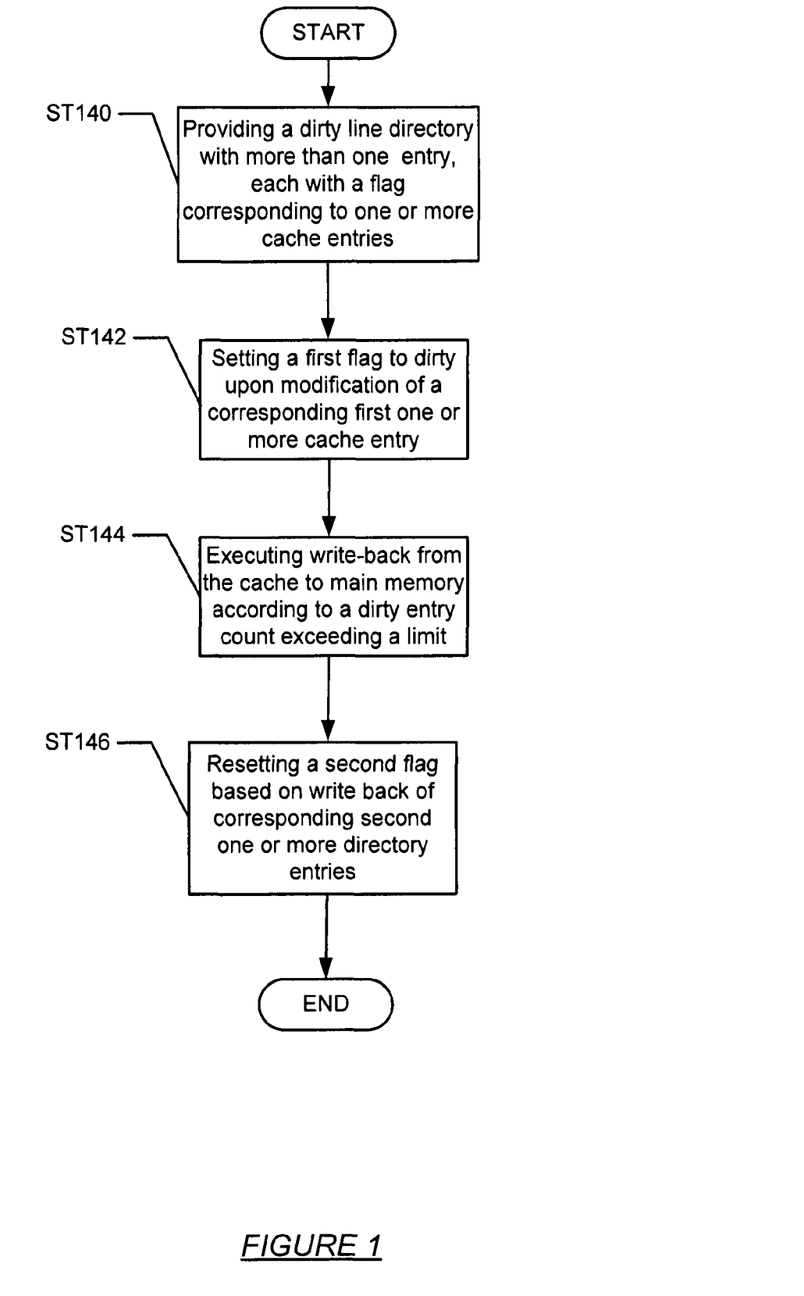
FIG. 1 shows a flowchart in accordance with one embodiment of the invention.

FIG. 1 shows a flow chart in accordance with one embodiment of the invention. In the embodiment shown in FIG. 1, a dirty line directory is provided to store multiple directory entries each having a flag and corresponding to one or more cache entry (e.g., a cache line) in the cache (ST140). Alternatively, each directory entry may correspond to multiple cache lines in the cache. Those skilled in the art will appreciate that not all directory entries may correspond to a uniform number of cache entries or cache lines. In addition, the dirty line directory is configured to store and update cache entry information.

The flag of each directory entry is set to a value according to a state of the corresponding one or more cache entry. The flag may be set to a value "dirty" if the corresponding cache line is dirty (i.e., the content of the cache line has been modified without being written back to the corresponding memory locations.) Alternatively, the flag may be set to a value "dirty" if one or more of the corresponding multiple cache lines is dirty (ST142).

Subsequently, the dirty flag is reset upon the eviction of the corresponding one or more cache entry according to a cache replacement protocol (e.g., the least recently used (LRU) replacement protocol) (ST146.) Further, the dirty line directory is configured to execute a write-back of one or more cache entries to maintain the number of dirty lines in the cache below a limit (ST144).

In one embodiment of the invention, the number of cache entries being written back may be pre-determined. Alternatively, the number of cache entries being written back may be dynamically determined using system performance statistics. In one embodiment of the invention, the limit is determined by the number of directory entries in the dirty line directory and may be pre-determined. Alternatively, the number of directory entries in the dirty line directory may be dynamically determined using system performance statistics to adjust the limit. Further, upon the write-back of the one or more of cache entries, the dirty flag of corresponding one or more directory entry is reset (ST146).

Figure 2:
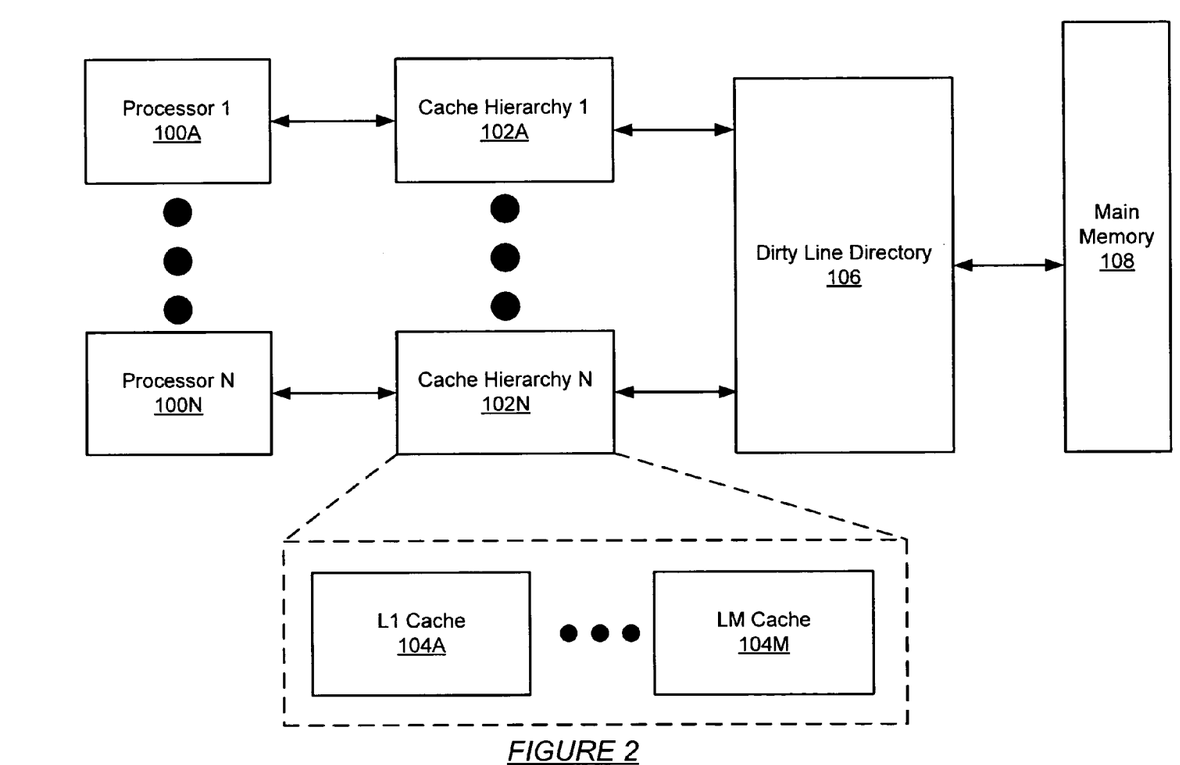
FIG. 2 shows a system in accordance with one embodiment of the invention.

FIG. 2 shows a system in accordance with one embodiment of the invention. The system includes one or more processors (Processor 1 (100A), Processor N (100N)) each operatively coupled to a corresponding cache hierarchy (cache hierarchy 1 (102A), cache hierarchy N (102N)). The cache hierarchy (cache hierarchy 1 (102A), cache hierarchy N (102N)) may include one or more caches (e.g., L1 Cache (104A), LM Cache (104M)). Each cache (e.g., L1 Cache (104A), LM Cache (104M)) in the cache hierarchy (cache hierarchy 1 (102A), cache hierarchy N (102N)) is configured to store one or more cache entries. Each cache entry stores a copy of a piece of data currently stored in a main memory (108). Each copy of the piece of data is associated with a physical address of the main memory (108), or physical address, where it is stored.

Those skilled in the art will appreciate that not all processors (Processor 1 (100A), Processor N (100N)) in the system have to be operatively coupled to a cache hierarchy (cache hierarchy 1 (102A), cache hierarchy N (102N)). Further, each cache hierarchy (cache hierarchy 1 (102A), cache hierarchy N (102N)) in the system does not need to include a uniform number of caches (e.g., L1 Cache (104A), LM Cache (104M)). Continuing with the discussion of FIG. 2, each cache hierarchy (cache hierarchy 1 (102A), cache hierarchy N (102N)) is operatively coupled to a dirty line directory (106). The dirty line directory (106), in turn, is operatively coupled to the main memory (108). Note also that multiple processors may themselves share a cache (as in the case of multi-core processors). Those skilled in the art will appreciate that the dirty line limiter protocol in accordance with the invention could also be used within this subsystem.

Continuing with the discussion of FIG. 2, in one embodiment of the invention, the dirty line directory (106) is configured to store cache entry information associated with the cache entries stored in the associated caches (e.g., L1 Cache (104A), LM Cache (104M)). The cache entry information may include, but is not limited to, a physical address associated with the cache entry (i.e., the physical address of the piece of data referenced by the cache entry), a value indicating the processor (Processor 1 (100A), Processor N (100N)) operatively coupled to the cache (e.g., L1 Cache (104A), LM Cache (104M)) in which the cache entry is stored, state information associated with the cache entry (e.g., whether the cache entry is dirty, etc.), etc. In addition, the dirty line directory (106) is configured to remove and update cache entry information in accordance with the dirty line limiter protocol.

In one embodiment of the invention, the dirty line directory (106) may implement the dirty line limiter protocol to track all dirty lines in the cache and forcing the replacement of an existing dirty line when a new one is needed once the number of existing dirty lines exceeds a limit (e.g., 10 percent of the cache being modified) or when the dirty line directory is fully populated (i.e., every directory entry is populated with cache entry information of one or more dirty lines.) Alternatively, more than one existing dirty line may be replaced when a new one is needed. Those skilled in the art will appreciate that other variations of the dirty line limiter protocol described above may also be used.

Though not shown in FIG. 2, in one embodiment of the invention, the dirty line directory (106) may be located along side a prior art directory (not shown, e.g., the prior art directory may implement a cache-coherency protocol) on the cache hierarchy side of a system interconnect (not shown) or integrated within the cache hierarchy (cache hierarchy 1 (102A), cache hierarchy N (102N)). Alternatively, the dirty line directory (106) may be located on the main memory side of the system interconnect (not shown) or integrated in a main memory controller (not shown) associated with the main memory (108). The dirty line directory may send snoop requests to the cache hierarchy (cache hierarchy 1 (102A), cache hierarchy N (102N)) over the system interconnect (not shown) to force the replacement of an existing dirty line.

Further, those skilled in the art will appreciate that while only a single directory (i.e., dirty line directory (106)) is shown in FIG. 1, the system may include additional directories. In addition, those skilled in the art will appreciate that while only a single memory (i.e., memory (108)) is shown in FIG. 1, the system may include separate portions of memory that are distributed across the system.

Figure 3:
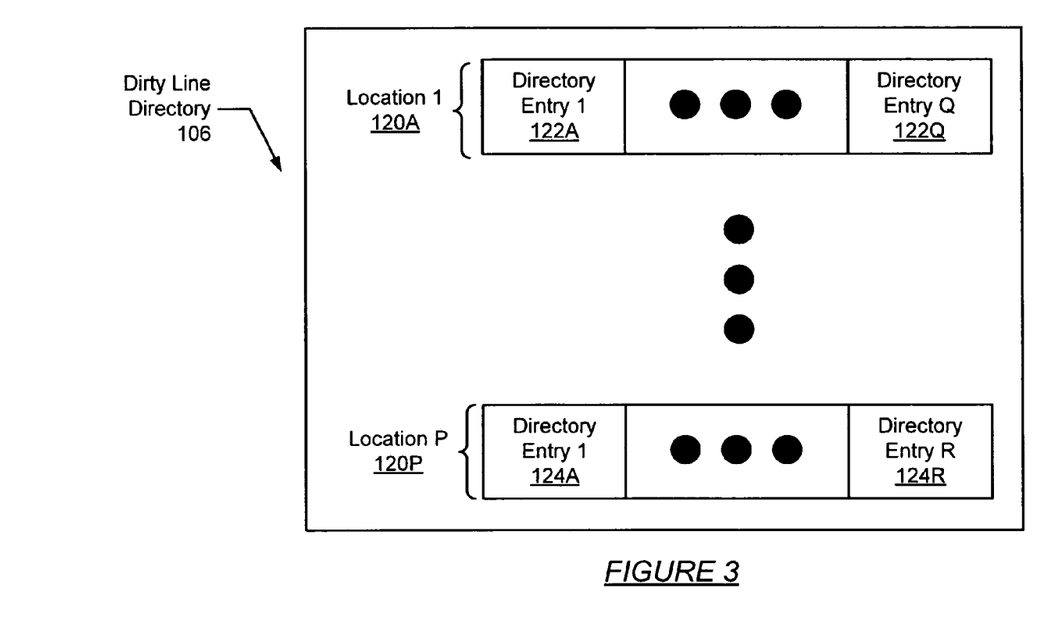
FIG. 3 shows a directory in accordance with one embodiment of the invention.

FIG. 3 shows a layout of the dirty line directory in accordance with one embodiment of the invention. In the embodiment shown in FIG. 3, the dirty line directory (106) includes one or more locations (location 1 (120A), location P (120P)). In one embodiment of the invention, the dirty line directory (106) includes functionality to index to a particular location (location 1 (120A), location P (120P)) using an address. Further, in one embodiment of the invention, the dirty line directory (106) uses the physical address associated with the piece of data in the corresponding cache entry to index into a location (location 1 (120A), location P (120P)) for storing the cache entry information. Alternatively, a virtual address may be used. In one embodiment of the invention, the dirty line directory is implemented in hardware as a set associative array comprising a plurality of locations each comprising a plurality of directory entries wherein each directory entry may be replaced according to the dirty line limiter protocol.

In one embodiment of the invention, a hash function is used by the dirty line directory (106) to index into a particular location (location 1 (120A), location P (120P)). The hash function may use, for example, a certain number of low-order bits from the physical address as input. In one embodiment of the invention, the hash function is configured such that multiple physical addresses index to the same location in the dirty directory (106).

In one embodiment of the invention, each location (location 1 (120A), location P (120P)) may include one or more directory entries. For example, location 1 (120) includes directory entry 1 (122A) through directory entry Q (122Q), and location P (120P) includes directory entry 1 (124A) through directory entry R (124R). Those skilled in the art will appreciate that the number of directory entries at each location (location 1 (120A), location P (120P)) does not have to be uniform.

Further, in one embodiment of the invention, each location includes between four and eight directory entries. In one embodiment of the invention, the number of directory entries available at a given location may be pre-determined. Alternatively, the number of directory entries at a given location may be dynamically determined using system performance statistics. Continuing with the discussion of FIG. 3, the dirty line directory (106) typically includes functionality to concurrently store cache entry information referencing different physical addresses at the same location in different directory entries (e.g., entry 1 (122A), entry Q (122Q), etc.). Further, the dirty line directory (106) typically includes functionality to remove the contents (i.e., cache entry information) from a single directory entry at a particular location (location 1 (120A), location P (120P)).

Figure 4:
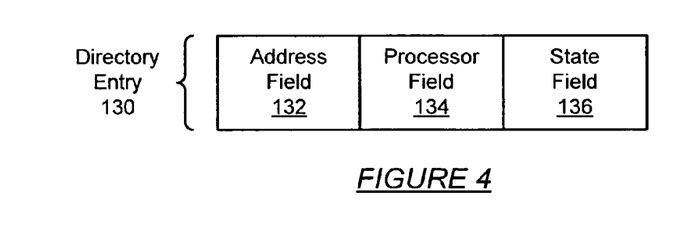
FIG. 4 shows an entry in accordance with one embodiment of the invention.

FIG. 4 shows a directory entry in accordance with one embodiment of the invention. In the embodiment shown in FIG. 4, the directory entry (130) includes an address field (132), a processor field (134), and a state field (136). In one embodiment of the invention, the address field (132) stores the physical address (or a portion thereof) associated with the data stored in the corresponding cache entry.

In one embodiment of the invention, the processor field (134) stores information used to identify the processor (Processor 1 (100A), Processor N (100N)) associated with the cache in which the corresponding cache entry is stored. In one embodiment of the invention, the state field (136) stores the value of the state of the corresponding cache entry, e.g. whether the cache entry is dirty.

The following example illustrates the information that would be stored in the dirty line directory (106) using the fields described in FIG. 4. Assume that data at physical address (A1) is loaded into a cache operatively coupled to processor X (PX). Thus, the corresponding entry in the dirty line directory may store the following information. The address field contains the value A1, the processor field contains the value PX, and the state field contains the value, for example, "dirty."

In one embodiment of the invention, if multiple caches contain a cache entry for the same piece of data from memory, then the corresponding cache entry information may be stored in one directory entry or multiple directory entries. For example, assume that data at physical address (A2) is stored in a cache associated with processor X (PX) and a cache associated with processor Y (PY), and then the corresponding cache entry information may be stored in one of two ways. First the cache entry information may be stored in two directory entries at the same location in the dirty line directory. Alternatively, one directory entry may be used to store the cache entry information for both cache entries. For the latter case, the corresponding directory entry in the dirty line directory may store the following information: the address field contains the value A2, the processor field contains the values PX and PY, and the state field contains the value, for example, "dirty."

Figure 5:
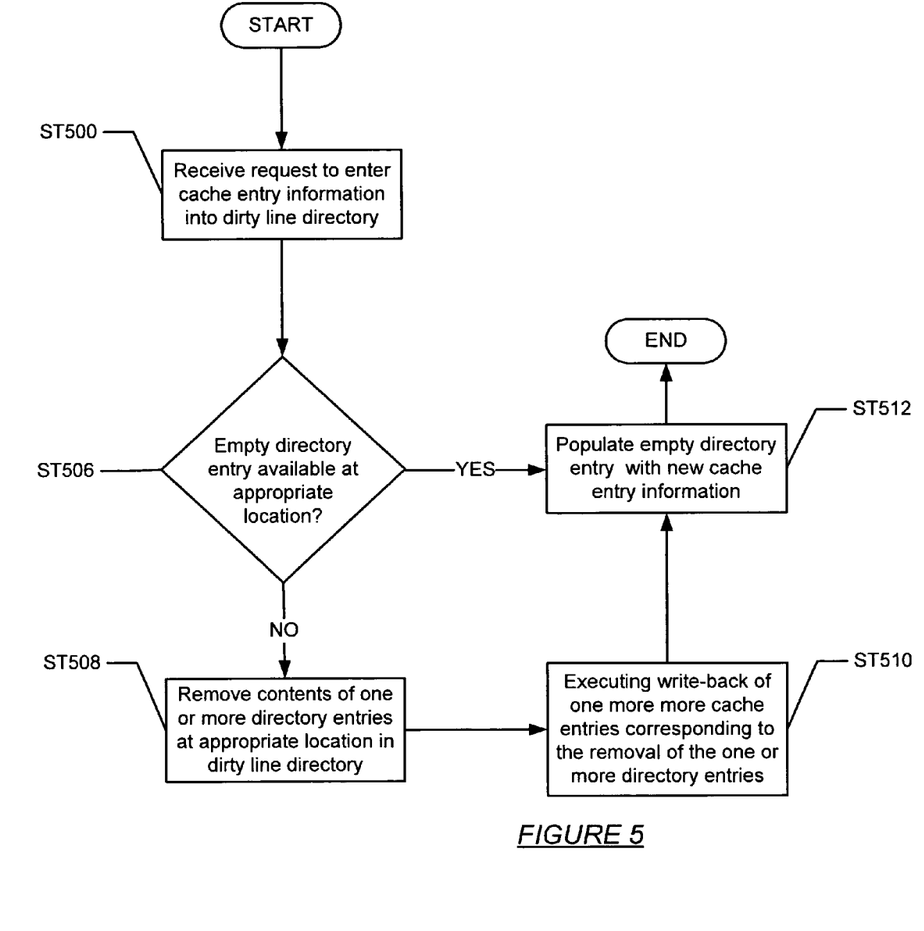
FIG. 5 shows a method for populating a directory entry in a dirty line directory with cache entry information.

FIG. 5 shows a method for populating a directory entry in the dirty line directory with cache entry information. In the embodiment shown in FIG. 5, a dirty line directory, as shown in FIG. 2, comprises a plurality of directory entries. A directory entry is populated according to a request to enter cache entry information received by the dirty line directory (ST500). The request may be the result, for example, of modification of one or more cache entry. The directory entry and the one or more cache entry are said to be corresponding to each other. If an empty directory entry is available (ST506), it is populated with the cache entry information (ST512). If no empty directory entry is available (ST506), the dirty line directory is configured to replace one or more existing directory entry according to a dirty line limiter protocol. Cache entry information associated with the replaced directory entry is removed (ST508). Further, one or more cache entry corresponding to the replaced directory entry is written back to a main memory (ST510). Once the write-back is executed, the method proceeds to ST512.

Figure 6:
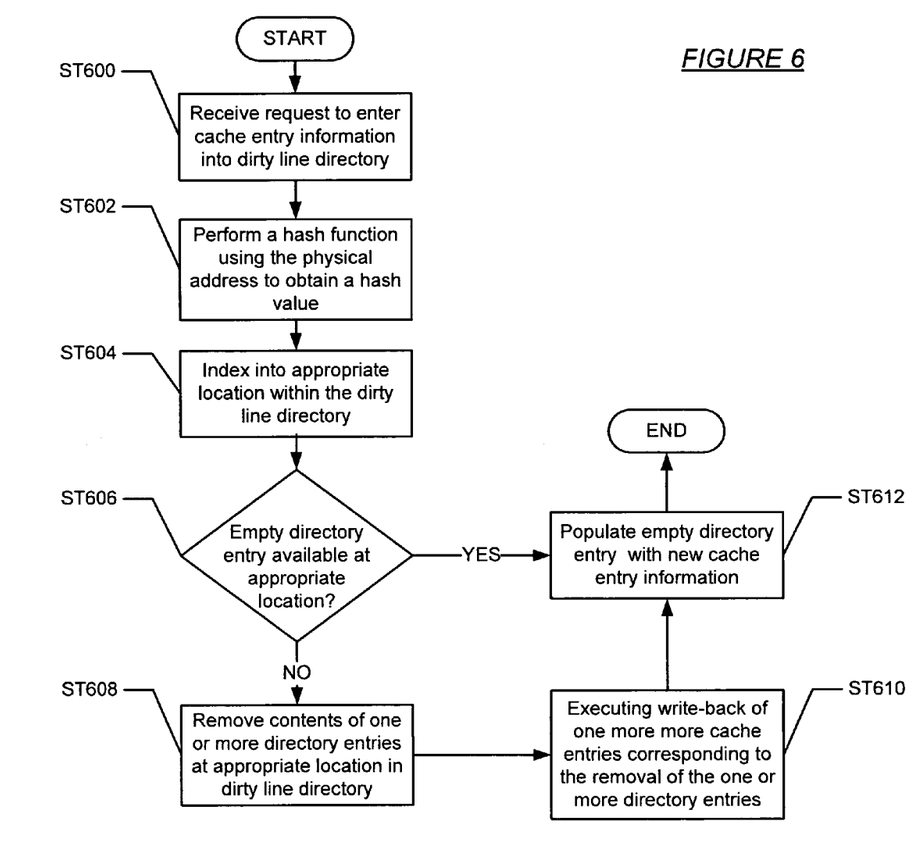
FIG. 6 shows a method for populating a directory entry in a dirty line directory implemented as a set associative array.

FIG. 6 shows a method for populating a directory entry in a set associative dirty line directory with cache entry information. In the embodiment shown in FIG. 6, the dirty line directory is implemented as a set associative array shown in FIG. 3. A request to enter cache entry information is initially received by the dirty line directory (ST600). As described above, the request may be the result, for example, of modification of one or more cache entry. As noted in description of FIG. 3, the cache entry information typically includes a physical address associated with the data. The physical address (or a portion thereof) is used as input into a hash function to obtain a hash value (ST602).

The hash value is subsequently used to index into a particular location within the dirty line directory (ST604). The dirty line directory subsequently queries the location to determine whether there is an empty directory entry that may be used to store the new cache entry information (i.e., the cache entry information received in ST 600) (ST606). If there is a directory empty entry at the location, then the empty directory entry is populated with the new cache entry information (i.e., the various fields in the entry are populated with the new cache entry information) (ST612). Alternatively, if there are no empty directory entries at the location, then the dirty directory proceeds to remove the contents (i.e., previously stored cache entry information) of one or more directory entries (as determined by the dirty line limiter protocol) at the location (ST608). In one embodiment of the invention, one directory entry at the location may be removed. Alternatively, all directory entries at the location may be removed. In another embodiment of the invention, the number of directory entries removed from the location may be dynamically determined using system performance statistics. In one embodiment of the invention, the directory entry to be removed from the location may be determined based on a least recently used (LRU) algorithm. Alternatively, the directory entry to be removed from the location may be determined randomly. Those skilled in the art will appreciate that other variations of the dirty line limiter protocol described above may also be used.

The dirty line directory proceeds to perform the appropriate actions, as specified by the dirty line limiter protocol in response to the removal of the contents of one or more directory entries at the location. In one embodiment of the invention, the affected caches are updated to reflect the removal of the cache entry information from the dirty line directory (i.e., corresponding cache entries are removed from the cache by executing write-back) (ST610). The dirty line directory, upon receiving confirmation that the cache entries have been removed, subsequently removes the cache entry information corresponding to one or more cache entries in the cache that have been removed from the corresponding cache. In one embodiment of the invention, the cache entries are removed in units of cache lines. Alternatively, the cache entries may be removed in units of varying sizes. Once the dirty line directory removes the appropriate cache entries, the method proceeds to ST612.

The following example shows the operation of the dirty line directory in accordance with embodiments of the invention shown in FIG. 6. Assume that data from memory having a physical address (A1) is loaded into a cache operatively coupled to processor X (PX). In accordance with the method shown in FIG. 4, the dirty line directory would use the physical address (A1) as input to a hash function to obtain a hash value. The hash value is then used to index to a location in the dirty line directory. The location is subsequently searched to determine whether there is an empty directory entry. In this example, assume that an empty directory entry is present. Thus, the dirty line directory may proceed to store the following information: the address field contains the value A1, the processor field contains the value PX, and the state field contains the value, for example, "dirty."

Figure 7:
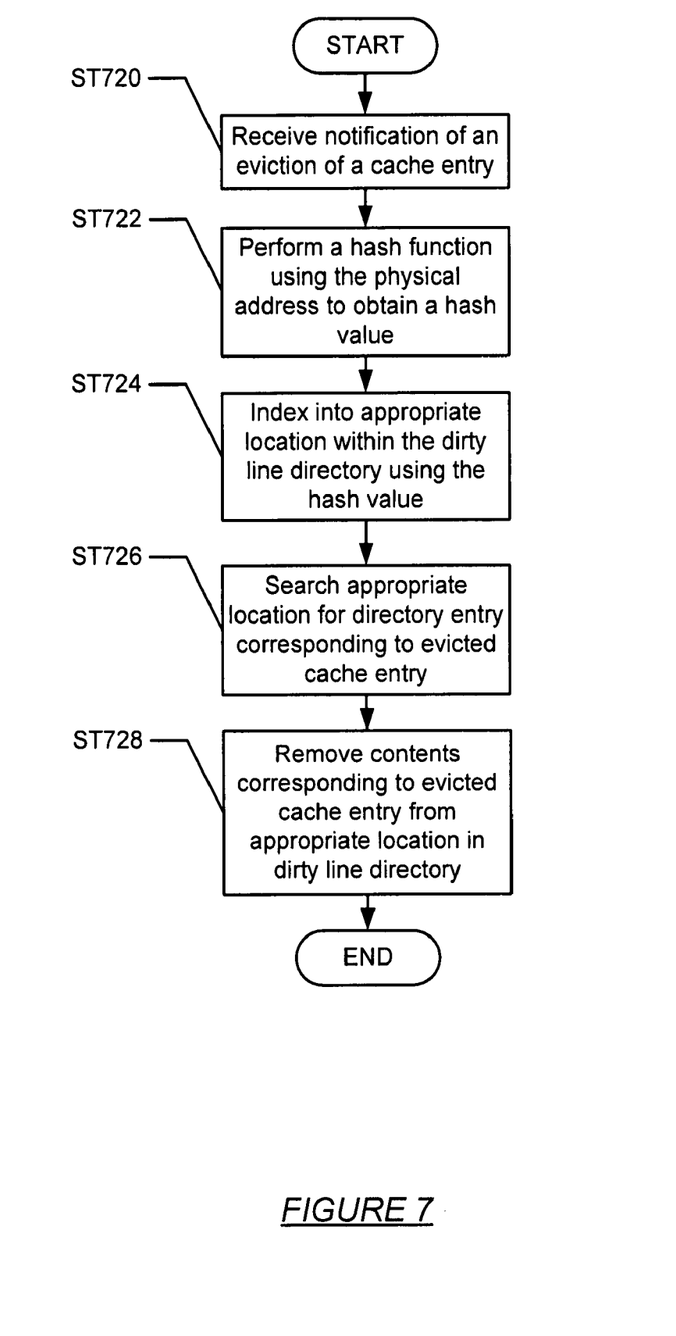
FIG. 7 shows a method for removing the contents of a directory entry in the dirty line directory.

FIG. 7 shows a method for removing the contents of a directory entry in the dirty line directory after a corresponding cache entry has been evicted in accordance with one embodiment of the invention. Initially, the dirty line directory receives notification of an eviction of a cache entry from a cache operatively coupled to the dirty line directory (ST720). The dirty line directory subsequently obtains the physical address of the data referenced by the evicted cache entry and performs a hash function using the physical address (or a portion thereof) to obtain a hash value (ST722). The dirty line directory subsequently uses the hash value to index into an appropriate location within the dirty line directory (ST724).

Once the appropriate location has been found, the directory entries at the location are searched to obtain the directory entry corresponding to the evicted cache entry (ST726). In one embodiment of the invention, searching for the directory entry corresponding to the evicted cache entry involves searching for the directory entry at the location in which the contents of the various fields (e.g., address field, processor field, state field, etc.) match those of the evicted cache entry. Once the corresponding directory entry at the location has been found, the contents of the directory entry are removed from the dirty line directory (ST728).

The following example shows the operation of the dirty line directory in accordance with embodiments of the invention shown in FIG. 7. Assume that a cache entry containing data having a physical address (A1) is evicted from a cache operatively coupled to processor X (PX). In accordance with the method shown in FIG. 5, the dirty line directory uses the physical address (A1) as input to a hash function to obtain a hash value. The hash value is then used to index to a location in the dirty line directory. The location is subsequently searched to determine whether a directory entry corresponding to the evicted cache entry exists. In this example, the dirty line directory searches for a directory entry containing the following information: an address field containing a value of A1, a processor field containing the value PX, and a state field containing the value, for example, "dirty." Once a directory entry having the aforementioned information is found, the contents of the directory entry are removed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing cache flush time of a cache connected to a main memory of a computer system by a system interconnect, comprising:
   setting a capacity of a dirty line directory (DLD) residing on a first side of the system interconnect, wherein the capacity defines a maximum number of directory entries in the DLD, and wherein the DLD stores only directory entries corresponding to dirty lines in the cache, wherein the main memory resides on the first side of the system interconnect, and wherein the cache resides on a second side of the system interconnect;
   identifying a first modification to the cache;
   populating, in response to the first modification, a directory entry of a plurality of directory entries in the DLD, wherein the directory entry comprises an address field and a processor field, and wherein the DLD is populated to the capacity after populating the directory entry;
   identifying a second modification to the cache after the DLD is populated to the capacity;
   de-populating a pre-determined number of the plurality of directory entries in response to identifying the second modification and the DLD being populated to the capacity; and
   sending, by the DLD and in response to de-populating the pre-determined number of the plurality of directory entries, a snoop request to the cache over the system interconnect to initiate a write-back from the cache to the main memory.

2. The method of claim 1, wherein the capacity is set to 10 percent of the cache being modified.

3. The method of claim 1, wherein the DLD comprises a set-associative array.

4. The method of claim 1, wherein the at least one populated directory entry is indicated by a flag.

5. The method of claim 1, wherein the capacity is set based on a system performance statistic.

6. The method of claim 1, further comprising:
   changing the capacity based on a system performance statistic.

7. The method of claim 1, wherein the pre-determined number is determined based on a system performance statistic.

8. The method of claim 1, further comprising:
   changing the pre-determined number based on a system performance statistic.

9. A system comprising:
   a processor;
   a system interconnect;
   a cache residing on a first side of the system interconnect;
   a main memory operatively connected to the processor, associated with the cache, and residing on a second side of the system interconnect, wherein the main memory is a primary memory of the system; and a dirty line directory (DLD) residing on the second side of the system interconnect, storing only directory entries corresponding to dirty lines in the cache, which:
- sets a capacity of the DLD, wherein the capacity defines a maximum number of directory entries in the DLD;
- identifies a first modification to the cache;
- populates, in response to the first modification of the cache, a directory entry of a plurality of directory entries in the DLD, wherein the directory entry comprises an address field and a processor field, and wherein the DLD is populated to the capacity after populating the directory entry;
- identifies a second modification to the cache after the DLD is populated to the capacity;
- de-populates a pre-determined number of the plurality of directory entries in response to identifying the second modification of the cache and the DLD being populated to the capacity; and
- sends, in response to de-populating the pre-determined number of the plurality of directory entries, a snoop request over the system interconnect to initiate a write-back from the cache to the main memory.

10. The system of claim 9, wherein the capacity is set to 10 percent of the cache being modified.

11. The system of claim 9, wherein the DLD comprises a set-associative array.

12. The system of claim 9, wherein the directory entry is indicated by a flag.

13. The system of claim 9, wherein the capacity is determined based on a system performance statistic.

14. The system of claim 9, wherein the capacity is dynamically defined based on a system performance statistic.

15. The system of claim 9, wherein the pre-determined number is based on a system performance statistic.

* * * * *